(12) United States Patent
Itoh et al.

(10) Patent No.: US 6,661,125 B2
(45) Date of Patent: Dec. 9, 2003

(54) LINEAR MOTOR

(75) Inventors: Masato Itoh, Horigano-mura (JP); Kimihiko Taknaka, Minowa-machi (JP); Katsuhiko Takeuchi, Matsumoto (JP)

(73) Assignee: Shinano Electronics Co., Ltd., Matsumoto (JP)

( * ) Notice: Subject to any disclaimer, the term of this patent is extended or adjusted under 35 U.S.C. 154(b) by 0 days.

(21) Appl. No.: 09/926,430

(22) PCT Filed: Feb. 2, 2001

(86) PCT No.: PCT/JP01/01533
§ 371 (c)(1),
(2), (4) Date: Nov. 2, 2001

(87) PCT Pub. No.: WO01/65671
PCT Pub. Date: Sep. 7, 2001

(65) Prior Publication Data
US 2002/0140295 A1 Oct. 3, 2002

(30) Foreign Application Priority Data
Mar. 2, 2000 (JP) .......................................... 2000-56721

(51) Int. Cl.[7] .............................................. H02K 41/03
(52) U.S. Cl. ........................................ 310/12; 318/135
(58) Field of Search .............................. 310/12, 13, 14; 318/135

(56) References Cited

U.S. PATENT DOCUMENTS

RE27,436 E * 7/1972 Sawyer ..................... 310/12 X

FOREIGN PATENT DOCUMENTS

| JP | 48-9204 | 5/1973 |
| JP | 60-014679 | 1/1985 |
| JP | 62-98481 | 6/1987 |
| JP | 04-125054 | 4/1992 |
| JP | 04-210768 | 7/1992 |

OTHER PUBLICATIONS

International Search Report dated May 21, 2001.

* cited by examiner

*Primary Examiner*—Nestor Ramirez
*Assistant Examiner*—Judson H. Jones
(74) *Attorney, Agent, or Firm*—Armstrong, Westerman & Hattori, LLP.

(57) ABSTRACT

A two-phase planar linear motor used for an IC test handler etc. comprising a platen (50) having a platen surface formed with a plurality of platen dots (D) arranged in a matrix and a composite movable member (70) comprised of two X-axis movable members (60X) and two Y-axis movable members (20Y) connected in an in-plane perpendicular relationship. The platen (50) is a stacked member comprised at a plurality of magnetic sheets T stacked together and uses the parallel sheet edge surfaces as the platen surface (51). The pole teeth ($KA_x$, $KA'_x$, $KB_x$, $KB'_x$) of the X-axis movable members (60X) are flat in the Y-axial direction and have equal spatial phases held with respect to the closest dots (D) in the Y-axial direction, but the above pole teeth arrayed repeatedly at each one dot pitch in the normal direction (X-axial direction) of the joined surfaces of the magnetic sheets (T) and fit in one pitch are arranged staggered with spatial phases held with respect to the closest dots (D) in the X-axial direction shifted by increments of spatial phase difference of ¼ pitch. Due to this staggered arrangement, the X-axis movable members (60X) can proceed in the X-axial direction. Therefore, it is possible to use the stacked member of the magnetic sheets as a platen and provide a high speed, high thrust, and high efficiency linear motor.

7 Claims, 16 Drawing Sheets

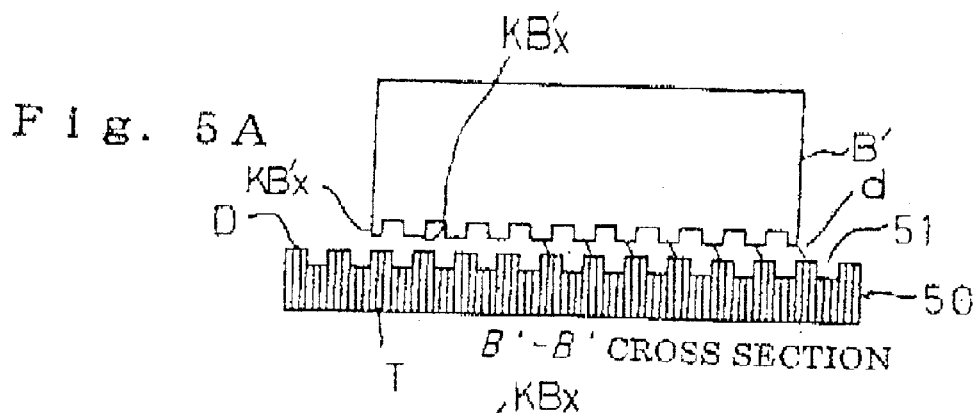
Fig. 5A — B'-B' CROSS SECTION
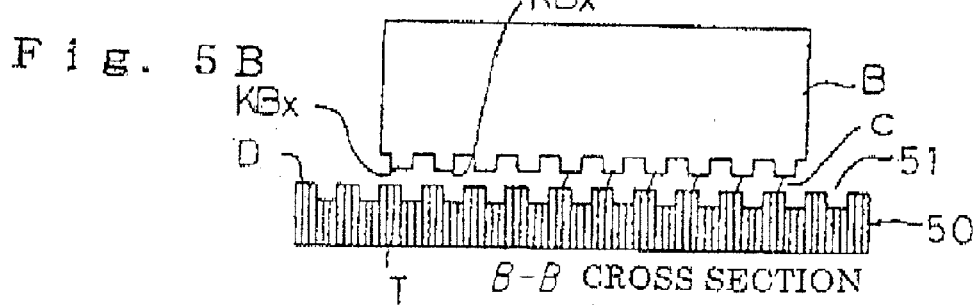
Fig. 5B — B-B CROSS SECTION
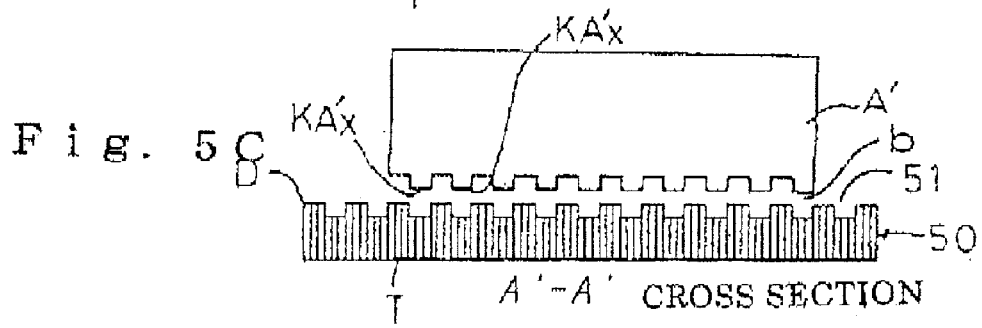
Fig. 5C — A'-A' CROSS SECTION
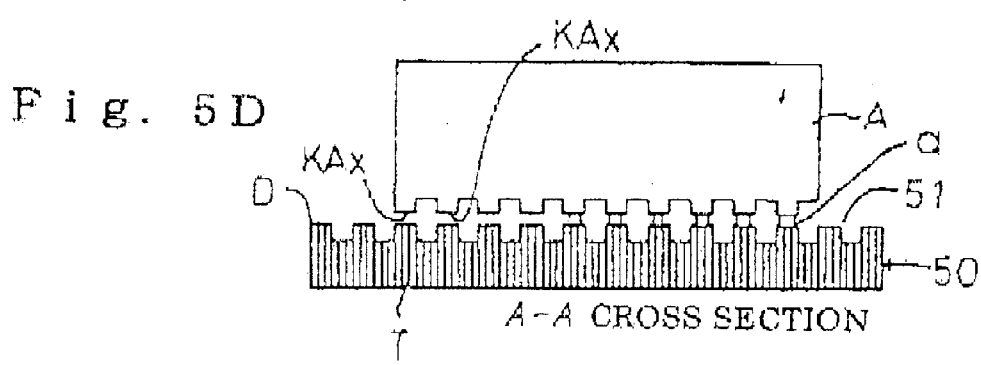
Fig. 5D — A-A CROSS SECTION
DIRECTION OF ADVANCE

W'-W'
CROSS SECTION

V'-V'
CROSS SECTION

U'-U'
CROSS SECTION

W-W
CROSS SECTION

V-V
CROSS SECTION

U-U
CROSS SECTION

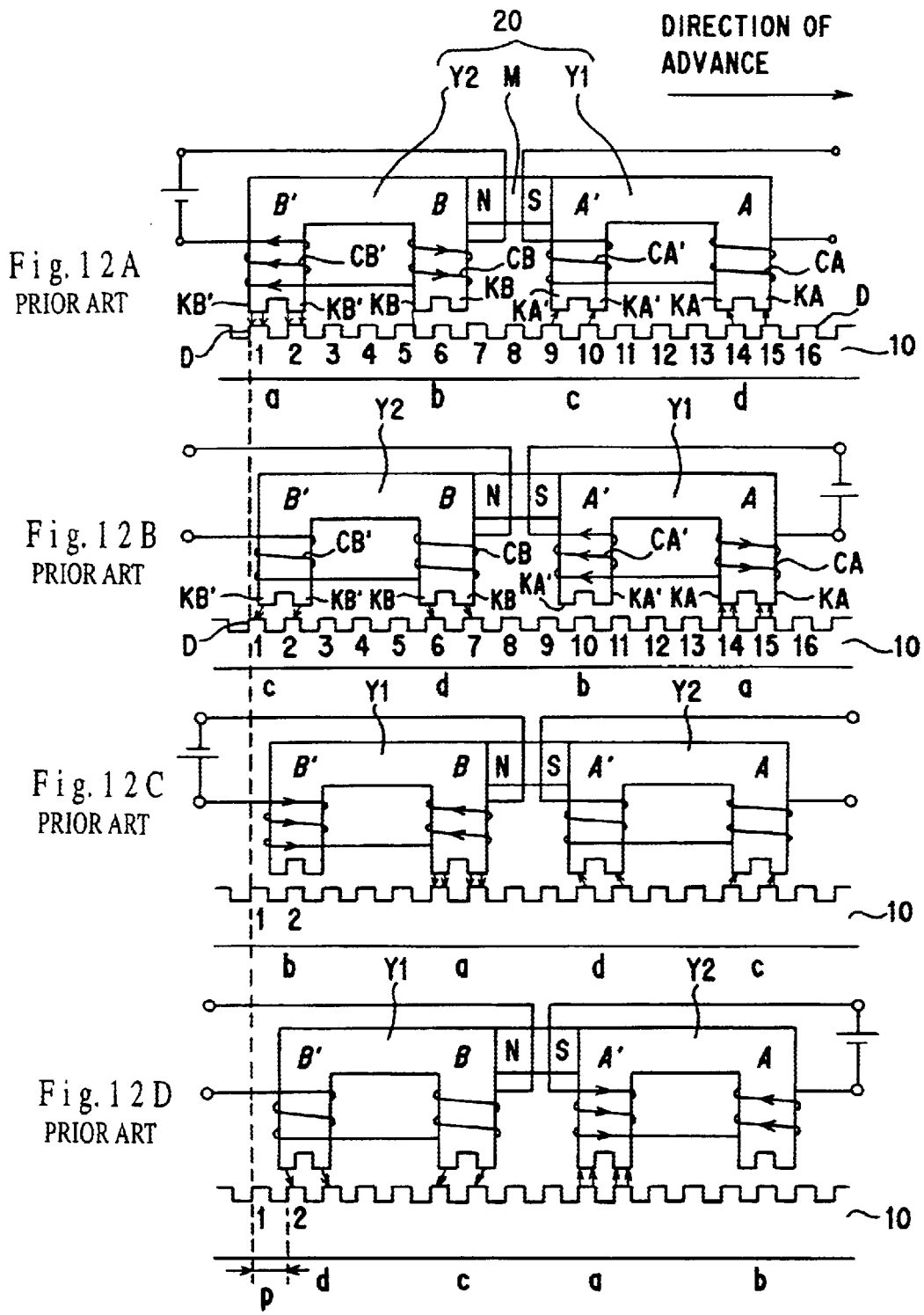

Fig. 14A
PRIOR ART
Fig. 14B
PRIOR ART
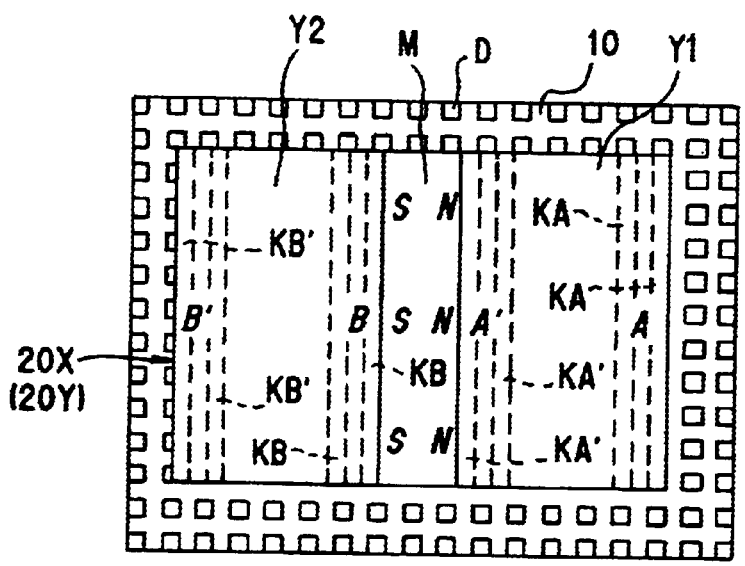
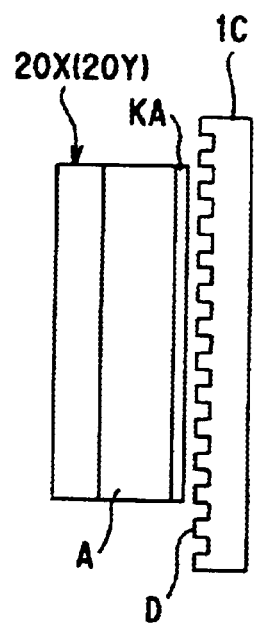
DIRECTION OF ADVANCE
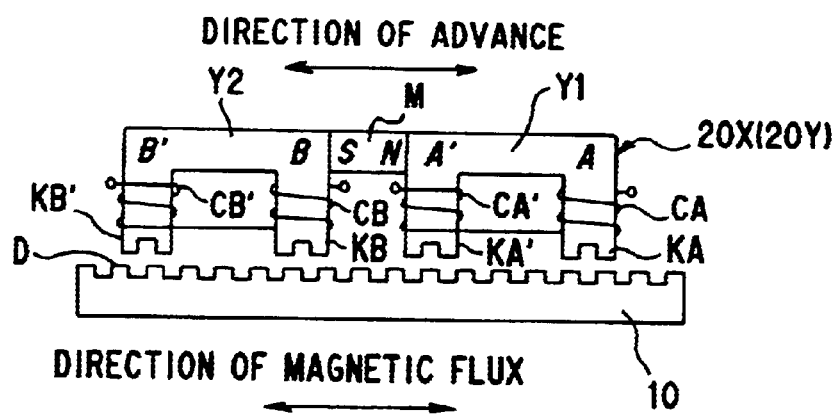
DIRECTION OF MAGNETIC FLUX
Fig. 14C
PRIOR ART

LINEAR MOTOR

TECHNICAL FIELD

The present invention relates to a linear motor, more particularly relates to a linear motor able to use a stacked member comprised of a plurality of magnetic sheets stacked together as a stator (platen).

BACKGROUND ART

Explaining the principle of a Sawyer linear motor, as shown in FIG. 12, it is comprised of a platen (stator) 10 comprised of a magnetic thick plate on whose surface is repeatedly formed platen dots D at a spatial period of the dot pitch P and a movable member (traveling member) 20 comprised of a permanent magnet M for generating a bias magnetic flux, first and second yokes Y1 (Y2) bonded to the magnetic pole surface to be arranged in parallel to the direction of advance and provided with first and second branched magnetic path legs A and A' (B and B'), series-connected first and second A-phase excitation coils CA and CA' wound around the first and second branched magnetic path legs A and A' of the first yoke Y1, series-connected first and second B-phase excitation coils CB and CB' wound around the first and second branched magnetic path legs B and B' of the second yoke Y2, and two pole teeth (projecting poles) KA and KA' (KB and KB') formed at each of the bottom ends of the first and second branched magnetic path legs A and A'(B and B') and arranged in the direction of advance at intervals of ½ of the dot pitch P. Here, each branched magnetic path leg may be formed with only one pole tooth, but in the event of several, the spatial phase held with respect to the closest dots of the platen dots D is the same. Further, the interval between the first branched magnetic path leg A (B) and second branched magnetic path leg A'(B') is set so that the spatial phases with respect to the closest dots are shifted in the direction of advance by exactly P/2. Further, the interval between the second branched magnetic path leg A' and the first branched magnetic path leg B is set so that the spatial phases with respect to the closest dots are shifted in the direction of advance by exactly P/4.

The movable member 20 has a pressurized air ejection port and floats slightly above the surface of the platen 10 by blown pressurized air. As shown in FIG. 12A, if a B-phase current of the illustrated polarity is flown through only the terminals of the first and second β-phase excitation coils CB and CB' of the second yoke Y2, not only the bias magnetic flux due to the permanent magnet M, but also the alternating magnetic flux due to the second excitation coil CB' are superposed and strengthened to generate a concentrated magnetic flux portion a in the air gap between the pole teeth KB' of the second branched magnetic path leg B' and the closest dots D1 and D2 and strongly magnetically draw the pole teeth KB' to the closest dots D1 and D2. Also, an alternating magnetic flux is applied to the pole teeth CB of the first branched magnetic path leg B in a direction canceling out the bias magnetic flux, so an extinguished magnetic flux portion b is formed. On the other hand, the magnetic flux comprised of the concentrated magnetic flux from the second branched magnetic path leg B' of the second yoke Y2 branched via the inside of the platen 10 passes through the first and second branched magnetic path legs A and A' of the first yoke Y1, but the pole teeth KA of the fist branched magnetic path leg A are delayed in the direction of advance by exactly P/4 with respect to the closest dots D15 and D14. Therefore, the closest dots D15 and D14 pull the pole teeth KA in the direction of advance by one branched magnetic flux and the pole teeth KA' of the second branched magnetic path leg A' proceed in the direction of advance by exactly P/4 with respect to the closest dots D10 and D9 due to the other branched magnetic flex Accordingly, the closest dots D10 and D9 pull the pole teeth KA' in a direction opposite to the direction of advance. Therefore, the thrust in the direction of advance and the pullback force in the reverse direction match each other perfectly and the first yoke Y1 as a whole is balanced. That is, a thrust branched magnetic flux portion d is generated in the air gap between the pole teeth KA of the first branched magnetic path leg A and the closest dots D15 and D14, while a pullback force branched magnetic flux portion c is generated in the air gap between the pole teeth KA' of the second branched magnetic path leg A' and the closest dots D10 and D9, so the first yoke Y1 itself becomes a stable point of the magnetic attraction potential.

Next, as shown in FIG. 12B, if an A-phase current of the illustrated polarity is supplied to only the terminals of the first and second A-phase excitation coils CA and CA' of the first yoke Y1, the air gap between the pole teeth KA of the first branched magnetic path leg A and the closest dots D15 and D14 switches from what had been the thrust branched magnetic flux portion d immediately before to the concentrated magnetic flux portion a comprised of the bias magnetic flux plus the alternating magnetic flux from the second excitation coil CA superposed, while the pole teeth KA' of the second branched magnetic path leg A' switch from the pullback branched magnetic flux portion c to the extinguished magnetic flux portion b, so the closest dots D15 and D14 strongly magnetically draw the pole teeth KA and advancing thrust occurs at the movable member 20. On the other hand, a branched magnetic flux to form the concentrated magnetic flux at the first branched magnetic path leg A of the first yoke Y1 through the inside of the platen 10 passes through the first and second branched magnetic path legs B and B' of the second yoke Y2. The pole teeth KB of the first branched magnetic path leg B switch from the extinguished magnetic flux portion b to the thrust branched magnetic flux portion d, while the pole teeth KB' of the second branched magnetic path leg B' switch from the concentrated magnetic flux portion a to the pullback branched magnetic flux portion c. Therefore, due to the switching of the two-phase current, the movable member 20 advances by exactly P/4, if including the excitation patterns of FIGS. 12C and 12D, with a two-phase current, there are four excitation patterns of the excitation coils, so by one round of the excitation patterns, the movable member 20 advances four times and proceeds by exactly one pitch worth of distance. In the process of the switching of the two-phase current, a thrust force is generated at the pole teeth moving from the thrust branched magnetic flux portion d to the concentrated magnetic flux portion a.

To realize a planar linear motor having a movable member which moves planarly in the Y-axis and Y-axial direction using such a Sawyer linear motor, for example, as seen in Japanese Unexamined Patent Publication (Kokai) No. 9-261944, as shown in FIG. 13 and FIG. 14, there are provided a platen 10 formed on the platen surface with square-top platen dots D arranged in a matrix and a composite movable member comprised of X-axis movable members 20X having stripe-shaped projecting pole teeth KA and KA' (KB and KB') parallel to the Y-axis and able to move in only the X-axial direction and Y-axis movable members 20Y having stripe-shaped projecting pole teeth KA and KA' (KB and KB') parallel to the X-axis and able to move in only the Y-axial direction—all connected by a support plate 30 in an in-planar perpendicular relationship.

Further, to reduce the vibration or pulsation of the movable members 20X (20Y) during the advance, as shown in FIG. 15, the yokes Y1 and Y2 may be given three branched magnetic path legs, the mutually independent phase excitation coils CU, CV, and CW (CU', CV', and CW') wound around the branched magnetic path legs U, V, and W (U', V', and W'), and a three-phase current supplied to these coils.

As a field of use of the above planar linear motor, for example, there is known a device mounting system providing a movable member moving planarly at the bottom surface of a platen held suspended down with an actuator for sliding in the normal direction of the bottom surface of the platen while holding an electronic device and inserting the electronic device into a through hole etc. of a substrate arranged under the platen.

The platen serving as the stator essential for the planar linear motor is formed on its surface with platen dots arranged in a matrix etc., so is comprised of a single thick plate magnetic material (thick steel plate) formed of a block material. Therefore, if this thick plate magnetic material is used as the platen, an eddy current naturally occurs due to the magnetic flux passing through the inside of the platen, so the AC magnetizing characteristic is poor and the power loss (iron loss) large and therefore it is difficult to obtain a high speed, high thrust force movable member and a large current capacity is required. As will be understood from the characteristic curve α of the dependency of the thrust force versus speed shown in FIG. 16, the higher the frequency the driving periodic current (current pulse) is made and the higher the speed of the advance, the more rapidly the thrust force falls and the much worse the efficiency (speed×thrust force/power consumption) becomes.

The present inventors took note of the fact that it is possible to suppress the occurrence of the eddy force and realize a high speed, high thrust, and high efficiency planar linear motor by using a stacked member comprised of a plurality of magnetic sheets (for example, a thickness of not more than 1 mm), using the parallel sheet edge surfaces of the stacked member (surface where edges of plurality of sheets appear in parallel) as the platen, and forming the platen dots arranged in a matrix by etching etc. the platen surface. Since an eddy current does not easily pass through the stacked interfaces (joined surfaces) of the magnetic sheets, the current resistance becomes higher and occurrence of an eddy current can be suppressed, so it is expected to be possible to realize a high speed, high thrust, high efficiency planar linear motor.

By making the row of pole teeth of a monoaxial movable member and the row of closest platen dots facing the same match and making the concentrated magnetic flux portion, extinguished magnetic flux portion, and branched magnetic flux portion (thrust, branched magnetic flux portion and pullback branched magnetic flux portion) move in a cyclic manner along the row direction in the magnetic circuit formed in the plane including the two rows, the monoaxial movable member advances along the row direction, so when the direction of arrangement of the pole tooth row of the monoaxial movable member and row of closest dots is the sheet edge direction of the magnetic sheets, the magnetic circuit for the advancing magnetic flux is formed in the thicknesses of the magnetic sheets in parallel to the joined surfaces, so advance of a monoaxial movable member in the sheet edge direction becomes possible and the above advantages can be obtained.

The magnet flux in the stacked member, however, is refracted or blocked at the joined surfaces and the magnetic resistance is high, so it is not actually possible to form a magnetic circuit for an advancing magnetic flux along the normal direction of the joined surfaces and advance of the monoaxial movable member in the normal direction of the joined surfaces (direction perpendicular to the sheet edge direction) is impossible. Therefore, up until now, everyone has given up on development of a planar linear motor using a stacked member as a platen.

Therefore, in view of the above problem, the object of the present invention is to realize a monoaxial movable member giving thrust in the normal direction of the joined surfaces of a stacked member and thereby enabling utilization of the stacked member of the magnetic sheets as a platen and provide a high speed, high thrust, high efficiency linear motor.

DISCLOSURE OF INVENTION

To solve the above problem, the means devised by the present invention is to form a magnetic circuit for generating an advancing magnetic flux (concentrated magnetic flux and branched magnetic flux) for the movable member along the sheet edge direction of the stacked member and causing magnetic coupling between one set of pole teeth of the movable member and the platen dots in the normal direction of the joined surfaces of the stacked member by arranging staggered one set of pole teeth in a predetermined spatial phase relationship within one pitch in the normal direction of the joined surfaces.

That is, the present invention provides a linear motor provided with a platen having a platen surface formed with a plurality of platen dots arranged in a matrix and on X-axis movable element having an pole tooth pattern having a set of at least 2n (where n is an integer of 2 or more) pole teeth for generating on advancing magnetic flux with the closest dots among the platen dots, wherein the platen has the parallel sheet edge surfaces of the stacked member comprised of the plurality of magnetic sheets stacked together as the platen and wherein the 2n number of magnetic teeth of the pole tooth pattern are arranged laterally in equal spatial phase relation with the closest dots arranged in the sheet edge direction (Y-direction) of the magnetic sheets. Further, the 2n number of pole teeth of the pole tooth pattern are arranged staggered within one dot pitch (P) in the normal direction of the joined surfaces of the magnetic sheets. The spatial phase held with respect to the closest dot arranged in the normal direction is shifted by increments of the spatial phase difference (P/2n). That is, the spatial phases held by the pole teeth with respect to the closest dots, when any spatial phase is p, are assigned as p−P/4, p, p+P/4, and p+P/2 when n=2, as p−P/3, p−P/6 p, p+P/6, p+P/3, and p+P/2 when n=3, and as p−3P/8, p−P/4, p−P/8, p, p+P/8, p+P/4, p+3P/8, and p+P/2 when n=4.

According to this configuration, since all of the 2n number of pole teeth of the pole tooth pattern hove spatial phases held with respect to the closest dots arrayed in the sheet edge direction (Y-axial direction) of magnetic sheet, the X-axis movable member does not receive a thrust force to the Y-axial direction, but the 2n number of pole teeth of the pole pattern of the X-axis movable member are arranged staggered shifted in phase in one dot pitch P in the normal direction of the joined surfaces of the magnetic sheets, so the magnetic circuit for the advancing magnetic flux is formed along the sheet edge direction of the stacked member. Further, the 2n number of pole teeth of the pole pattern of the X-axis movable member have spatial phases held with respect to the closest dots arranged in the normal direction of the joined surface of the magnetic sheets shifted by exactly increments of the spatial phase difference (P/2n), so magnetic couplings are caused with the closest dots arranged in the X-axial direction, the thrust force in the X-axial direction acts successively on the 2n number of pole teeth of the pole tooth pattern laterally elongated in the Y-axial direction due to the cycle of combination of the concentrated magnetic flux and branched magnetic flux, and the X-axis movable member moves translationally in the X-axial direction due to so-called "crawling motion".

In this way, since it is possible to realize a monoaxial movable member giving thrust in the normal direction of the joined surfaces of the stacked member, it is possible to realize utilization of a stacked member of magnetic sheets as a platen and possible to provide a high speed, high thrust, high efficiency linear motor. The thrust force acts on the pole teeth switching from the branched magnetic flux to the concentrated magnetic flux, but the branched magnetic flux and concentrated magnetic flux occur at pole teeth of different yokes, so a rotational moment acting on the X-axis movable member occurs alternately in the forward and reverse directions. The higher the speed of movement, however, the smaller the ratio of the rotational vibration with respect to the speed of travel.

The pole teeth where the extinguished magnetic flux portion occurs differs the most, that is, half of a pitch, among the pole teeth from the pole teeth where the concentrated magnetic flux occurs. In the case of a platen using a magnetic sheet having a thickness of within half a pitch, the magnetic circuit formed along the sheet edge direction inherently finds it hard to hold magnetic couplings with pole teeth where extinguished magnetic flux parts occur, so there is no need to generate an alternating magnetic flux of a strength exactly extinguishing the bias magnetic flux and the degree of freedom of design is increased. In the case of a two-phase linear motor, the spatial phase difference held by an pole tooth of the concentrated magnetic flux portion and the pole teeth of the pair of branched magnetic fluxes with respect to the closest dots is P/4, while the spatial phase difference held by the pole tooth of one branched magnetic flux and the pole tooth of the other branched magnetic flux is P/2. In the case of a three-phase linear motor, the spatial phase difference held by an pole tooth of the concentrated magnetic flux and the pole teeth of the pair of branched magnetic fluxes with respect to the closest dots is P/6, while the spatial phase difference of the pole tooth of one branched magnetic flux and the pole tooth of the other branched magnetic flux with respect to the closest dots is P/3. Therefore, in the case of a three-phase linear motor, it is preferable to use a magnetic sheet with a thickness of not more than 1/3 of the pitch. In general, in the case of an n-phase linear motor, it is preferable to use a magnetic sheet having a thickness of not more than 1/n of the pitch. The greater the number of phases, the thinner the sheets. With three or more phases, magnetic coupling is hard to occur at both of the pair of pole teeth where the weak branched magnetic flux occurs, so the excess magnetic coupling consumed in stopping the progression is cut off and can be put to use in the thrust force of the progression. Rather, a higher efficiency can be expected from the X-axis movable member giving thrust in the perpendicular direction compared with the Y-axis movable member giving thrust in the sheet edge direction. Therefore, the present invention is not limited to the X-axis movable member of a 2D planar linear motor and has sufficient value of use as a one-dimensional linear motor comprised of a platen using a stacked member and a monoaxial movable member giving thrust in a normal direction of the joined surfaces of the stacked member. Further, since the platen is a stacked member of magnetic sheets, it may be a stacked member with plastic or other nonmetallic materials sandwiched between dots in the X-axial direction. Further, it is not necessary to provide recesses between the dots. The platen can also be fabricated easily. Further, the leakage magnetic flux can be reduced and a higher efficiency can be contributed to.

Note that the spatial phase relationship between the set of poles of the movable member side and the set of closest dots of the platen side is relative, so instead of giving a staggered arrangement in the phase relationship among the pole teeth of the movable member, it is also possible to give a staggered arrangement in the phase relationship among the platen dots arranged in the X-axial direction of the platen side.

When the X-axis movable member has a group of patterns comprised of a pole tooth pattern arranged repeatedly in the normal direction of the joined surfaces, it is possible to obtain stable travel and high output of the X-axis movable member.

A pair of patterns are formed comprised of the above pole tooth pattern as a first pole tooth pattern and a second pole tooth pattern separated in the normal direction from the first pole tooth pattern. The staggered arrangement of the first pole tooth pattern and the staggered arrangement of the second pole pattern are line symmetric about the X-direction line passing through the pattern center. Both staggered arrangements are in spatial phase relationship held with respect to the closest dots arranged in the normal direction of the joined surfaces of the magnetic sheets of the first pole tooth pattern and the second tooth pattern, respectively. Since a forward and reverse rotational moment simultaneously act on the X-axis movable member, the rotational moments are canceled out and it is possible to eliminate rotational vibration.

When the X-axis movable member has a group of patterns comprised of the first pole pattern and second pole pattern arranged alternately repeatedly in the normal direction of the joined surfaces, it is possible to again obtain stable travel and high output of the X-axis movable member.

It is preferable to configure the planar linear motor by the above X-axis movable member and Y-axis movable member moving in the sheet edge direction of the magnetic sheets connected in an in-plane perpendicular relationship, but here two X-axis movable members and two Y-axis movable members are arranged diagonally with respect to the center point of the plane of the composite movable member and arrange the pole tooth pattern of one X-axis movable member and the pole tooth pattern of the other X-axis movable member fine symmetrically with respect to the X-direction line passing through the center point of the plane. The rotational moment about the center point of the plane of the composite movable member acts simultaneously in the forward and reverse directions, the rotational moments are canceled out, and the rotational vibration of the composite movable member as a whole can be eliminated and therefore stable travel in the X-axial direction and Y-axial direction can be realized from low speed travel to high speed travel.

BRIEF DESCRIPTION OF DRAWINGS

FIGS. 5A to 5D are sectional views of the states cut along the line B'—B', line B—B, line A'—A', and line A—A in FIG. 3.

FIGS. 12A to 12D are progressive views of the operation for explaining the principle of a Sawyer motor (two-phase linear motor).

FIG. 14A is a plan view of a two-phase planar linear motor in FIG. 13, FIG. 14B is a right side view of the same two-phase planar linear motor, and FIG. 14C is a front view of the same two-phase linear motor.

BEST MODE FOR CARRYING OUT THE INVENTION

First Embodiment

Figure 1:
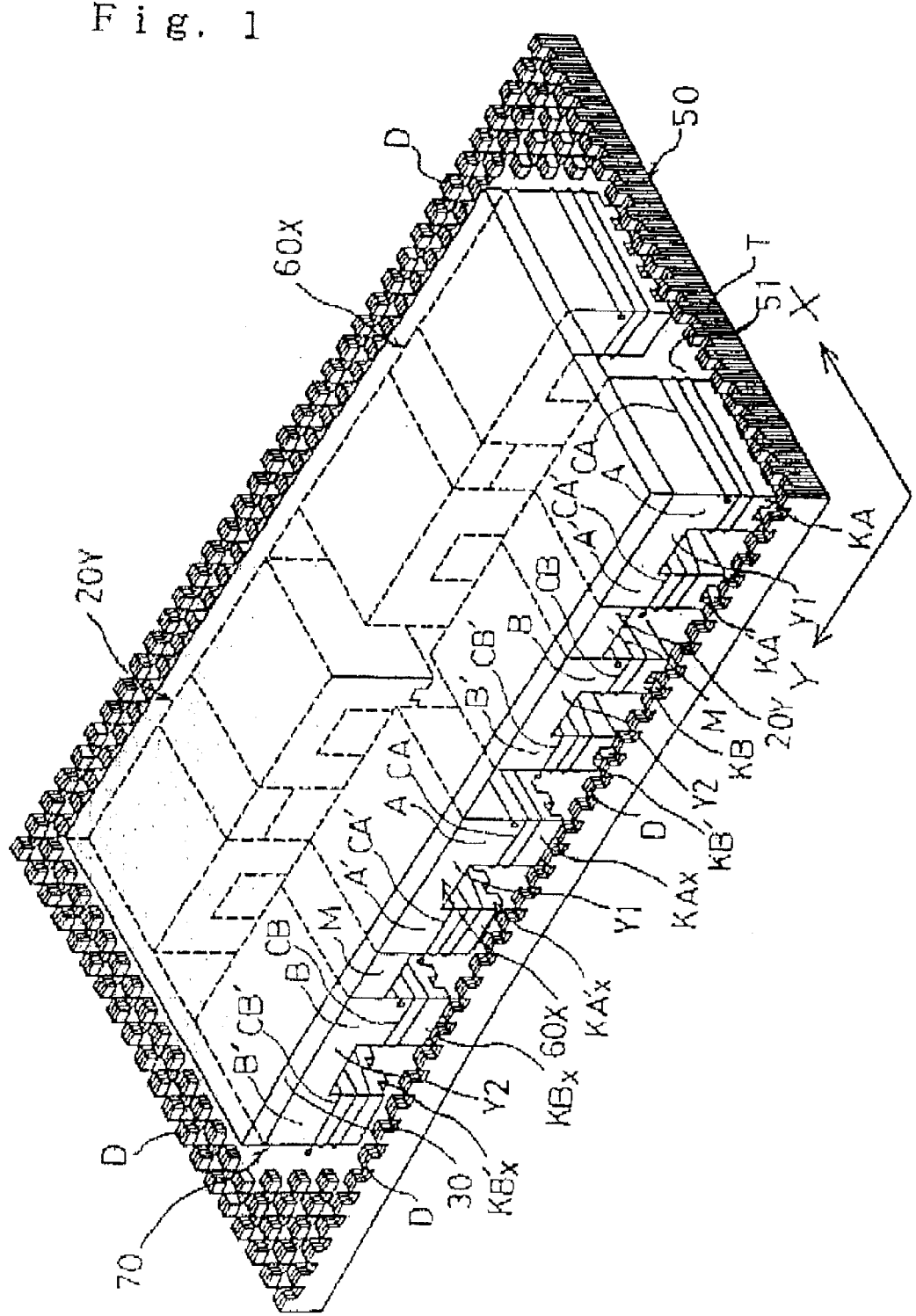
FIG. 1 is a perspective view of the general configuration of a 2-phase planar linear motor according to a first embodiment of the present invention.
Figure 2:
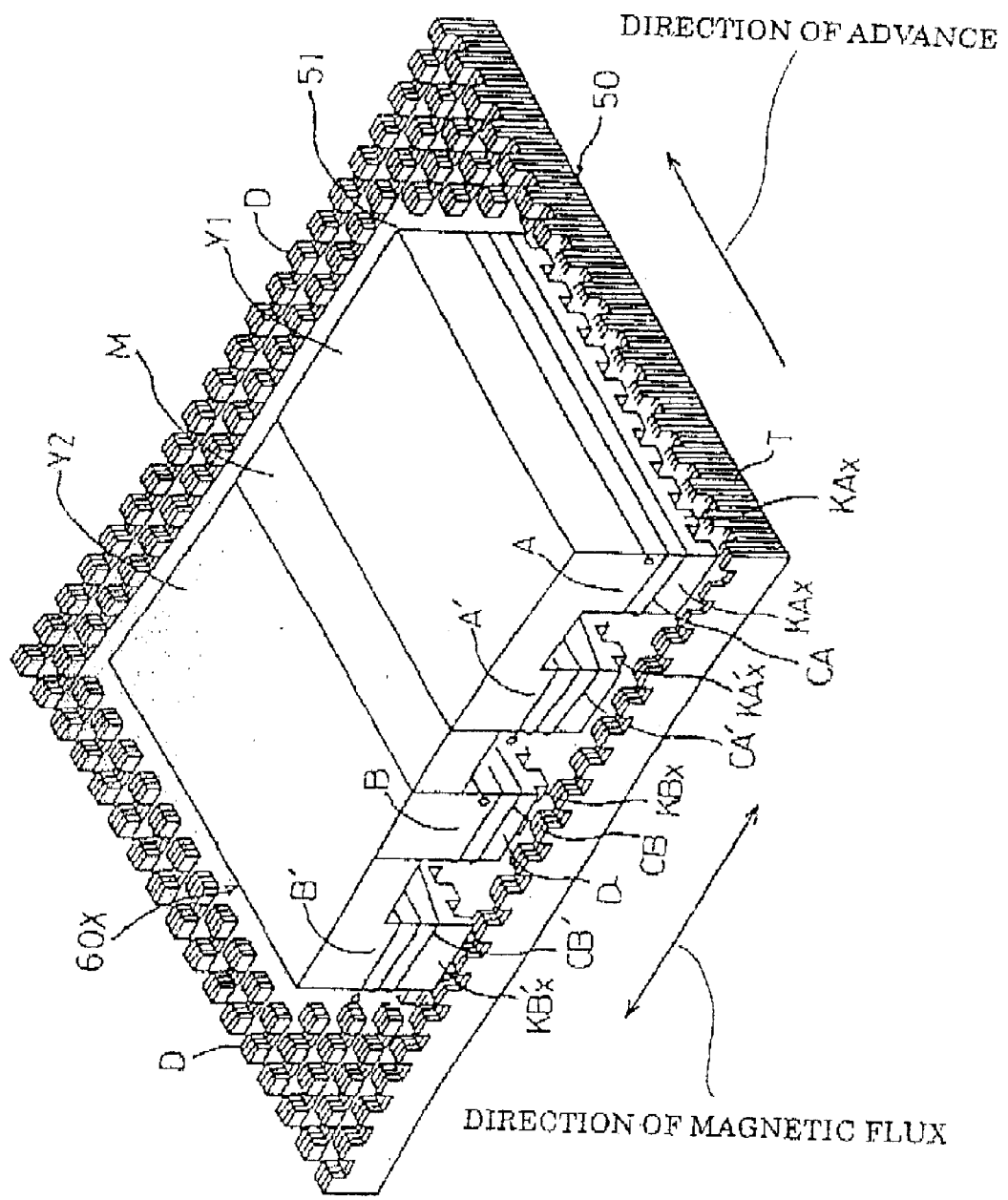
FIG. 2 is a perspective view of an X-axis movable member in the motor.
Figure 3:
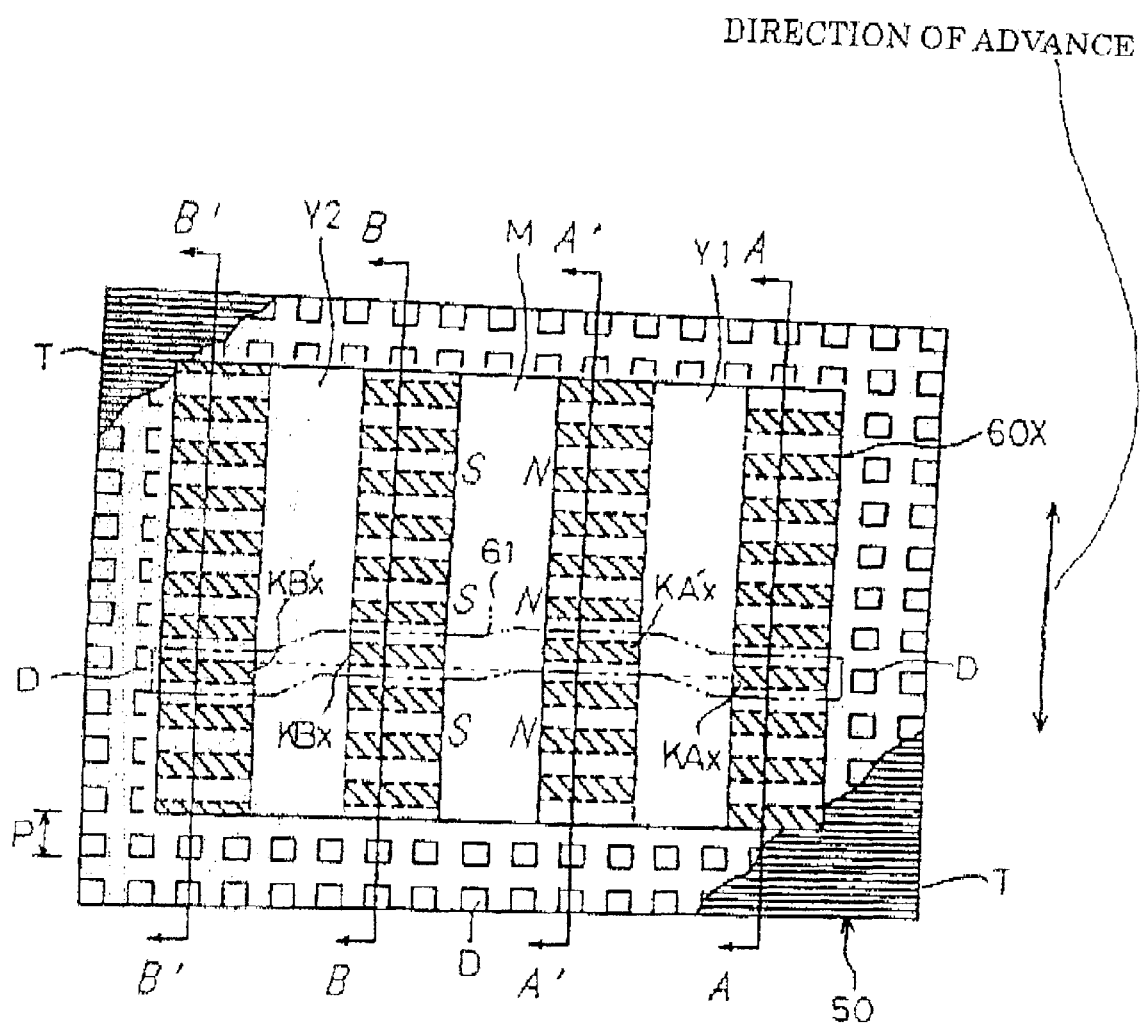
FIG. 3 is a plan view of the spatial phase relationship between the pole teeth of the X-axis movable member and platen dots.
Figure 4:
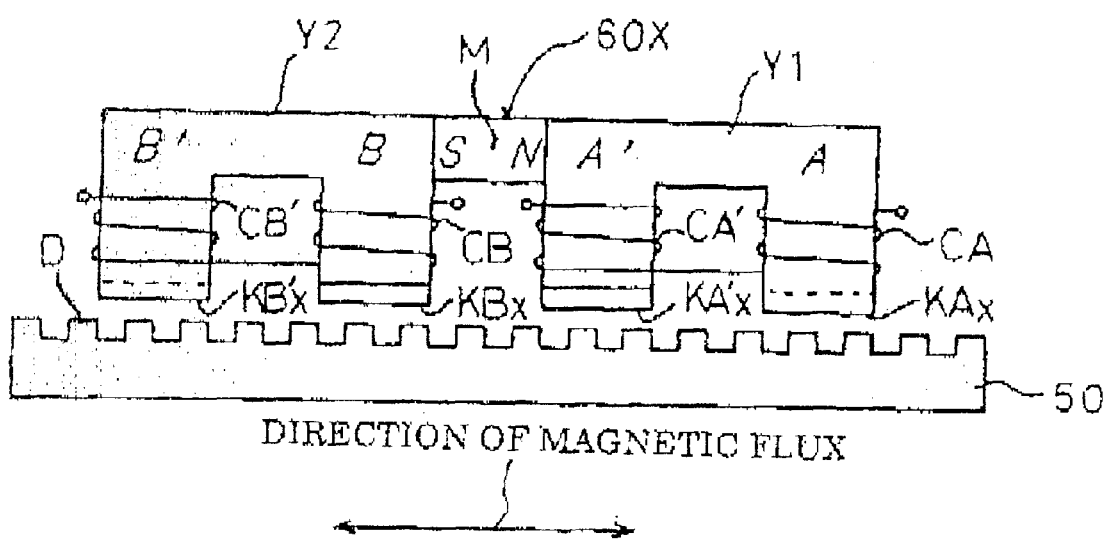
FIG. 4 is a side view of an X-axis movable member seen in the X-axial direction.
Figure 13:
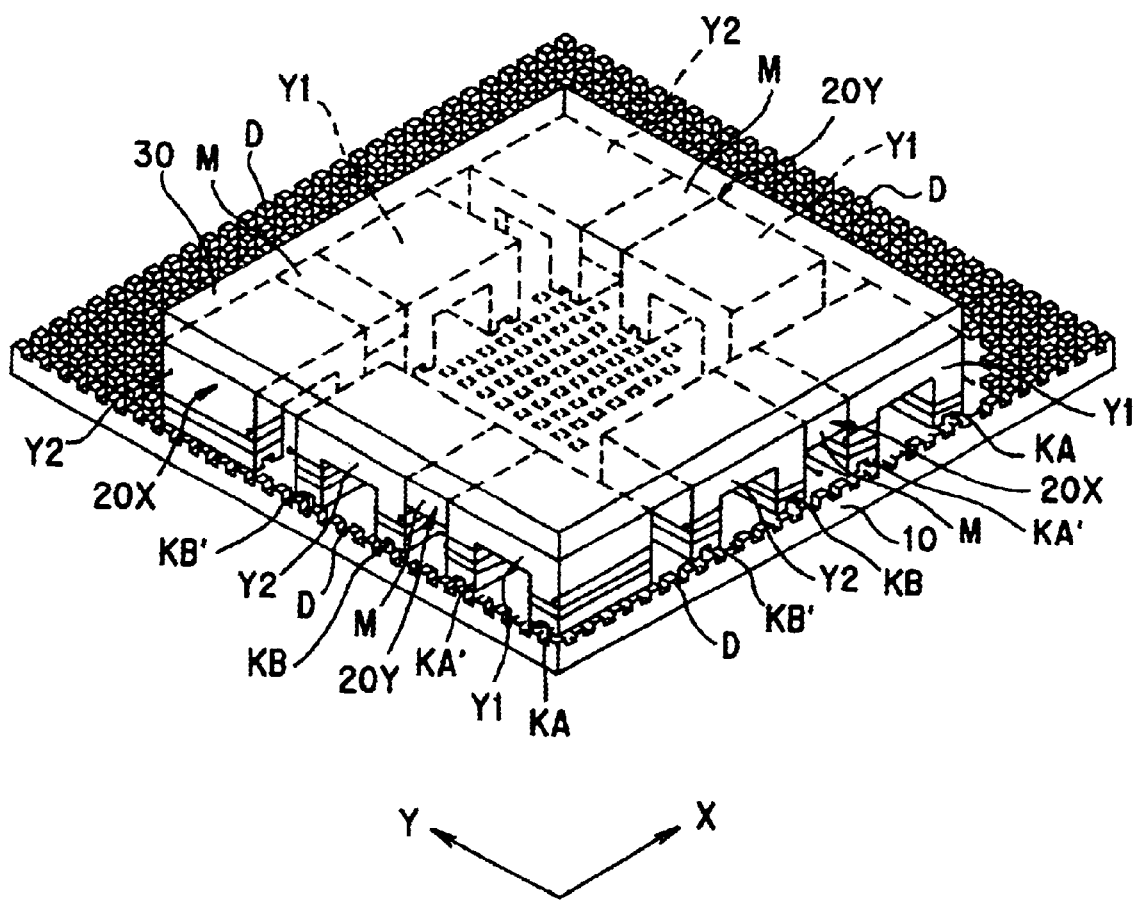
FIG. 13 is a perspective view of the schematic configuration of a conventional 2-phase planar linear motor.

FIG. 1 is a perspective view of the general configuration of a 2-phase planar linear motor according to a first embodiment of the present invention; FIG. 2 is a perspective view of an X-axis movable member in the motor; FIG. 3 is a plan view of the spatial phase relationship between the pole teeth of the X-axis movable member and platen dots; FIG. 4 is a side view of an X-axis movable member seen in the X-axial direction; and FIGS. 5A to 5D are sectional views of the states cut along the line B'—B', line B—B, line A'—A', and line A—A in FIG. 3. Note that in FIG. 1 to FIG. 3, portions the same as those in FIG. 13 and FIG 14 are assigned the same reference numerals and explanations thereof will be omitted.

The two-phase planar linear motor of this embodiment is comprised of a platen 50 having a platen surface 51 formed with a plurality of platen dots D arranged in a matrix and a composite movable member 70 comprised of two X-axis movable members 60X and two Y-axis movable members 20Y connected by a support plate 30 in an in-plane perpendicular relationship. The composite movable member 70 has a pressurized air ejection part (not shown) and moves planarly while floating slightly above the surface of the platen 50 by the blown pressurized air.

This two-phase planar linear motor is employed for example as an IC test handler. The IC test handler is provided with a contact transfer which holds an IC at the entry position by suction, moves it to a test position, then descends to continue to press down terminals of the IC on the IC socket for a predetermined time, then suitably thereafter raises the IC and inserts it in an exit position. With this IC test handler, the platen 50 is supported suspended upside down from the illustrated state. The composite movable member 70 moves planarly along the platen surface directly under the platen 50 using the contrast transfer as a base.

The platen 50 is a stacked member comprised of a plurality of magnetic sheets T stacked together. As shown in FIG. 1 and FIG. 2 the parallel sheet edge surfaces are used as the platen surface 51. The magnetic sheets T are for example silicon steel sheets coated with insulating films of for example 0.35 to 0.5 mm thickness. The dot pitch of the platen dots D (one spatial period) is for example several mm.

Each of the Y-axis movable members 20Y is a movable member advancing in the sheet edge direction (Y-axial direction) of the magnetic sheets T. The first and second yokes Y1 (Y2), like in the past, have stripe-shaped projecting pole teeth KA and KA' (KB and KB') parallel with the X-axis.

The pole teeth $KA_x$ and $KA'_x$ ($KB_x$ and $KB'_x$) of the first and second branched magnetic path legs A and A' (B and B') of the first yoke Y1 of each of the X-axis movable members 60X are flat in the Y-axial direction as shown in FIG. 4 and have equal spatial phases with respect to the closest dots D arranged in the sheet edge direction of the magnetic sheets T. The lengths in the Y-axial direction of the pole teeth $KA_x$ and $KA_x$ ($KB_x$ and $KB'_x$) are two pitches worth of length of the platen dots D. The intervals between them are also two patches worth of length. However, the pole teeth $KA_x$ and $KA'_x$ ($KB_x$ and $KB'_x$) are repeatedly arrayed for each dot pitch (one spatial period=P) in the normal direction (X-axial direction) of the joined surfaces of the magnetic sheets T to form rows of teeth. As shown in FIG. 3 and FIG. 5, the pole teeth $KA_x$ and $KA'_x$ ($KB_x$, $KB'_x$) comprising a laterally arranged set (pole tooth pattern) fitting in one pitch are arranged staggered within one dot pitch in the normal direction of the joined surfaces of the magnetic sheets T. Further, the spatial phases held with respect to the closest dots arranged in the normal direction are shifted by increments of the spatial phase difference (P/4).

In the pole tooth pattern 61 surrounded by the two-dot chain line in FIG. 3, the pole tooth $KA_x$ is in register with the closest dot D, a concentrated magnetic flux portion a occurs in the air gap as shown in FIG. 5D, the pole tooth $KA'_x$ is staggered by exactly half a pitch with respect to the closest dot D, the air gap as shown in FIG. 5C becomes an extinguished magnetic flux portion b, the pole tooth $KB_x$ is staggered advanced by exactly P/4 from the closest dot D, the air gap shown in FIG. 5B becomes a pullback branched magnetic flux portion c, the pole tooth $KB'_x$ is staggered delayed by exactly P/4 from the closest dot D, and the air gap shown in FIG. 5A becomes the thrust branching magnetic flux portion d. Each X-axis movable member 60X has a group of patterns comprised of the above group of pole tooth patterns 61 repeated in the X-axial direction at a one-pitch period.

The pole teeth $KA_x$ and $KA'_x$ ($KB_x$ and $KB'_x$) of each pole tooth pattern 61 all have equal spatial phases with respect to the closest dots D arranged in the sheet edge direction (Y-axial direction) of the magnet sheets T, so while the X-axis movable member 60X does not receive thrust force in the Y-axial direction, the pole teeth $KA_x$ and $KA'_x$ ($KB_y$ and $KB'_x$) fit within one pitch in the X-axial direction, so a magnetic circuit for the advancing magnetic flux is formed along the sheet edge direction of the stacked member. In the state shown in FIG. 3 and FIG. 5 (excitation state due to A-phase current), the pole tooth $KB'_x$ generates a thrust branched magnetic flux portion d, so in the process of switching from the A-phase current to the B-phase current, a thrust force acts on the pole tooth $KB'_x$ in the X-axial direction, in the second switching process, a thrust force acts on the pole tooth $KA'_x$ in the X-axial direction, in the third switching process, a thrust force acts on the pole tooth $KB_x$ in the X-axial direction, and in the fourth switching process, a thrust force acts on the pole tooth $KA_x$ in the X-axial direction. An X-axial direction thrust force acts successively on the four pole teeth of each pole tooth pattern 61 laterally elongated in the Y-axial direction by the cycle of combination of the concentrated magnetic flux portion a and branched magnetic flux portion cd, whereby the X-axis movable member 60X moves translationally in the X-axial direction by a so-called "crawling motion". Of course, it moves translationally in the X-axial direction even in the case of a platen comprised of a block material.

Figure 16:
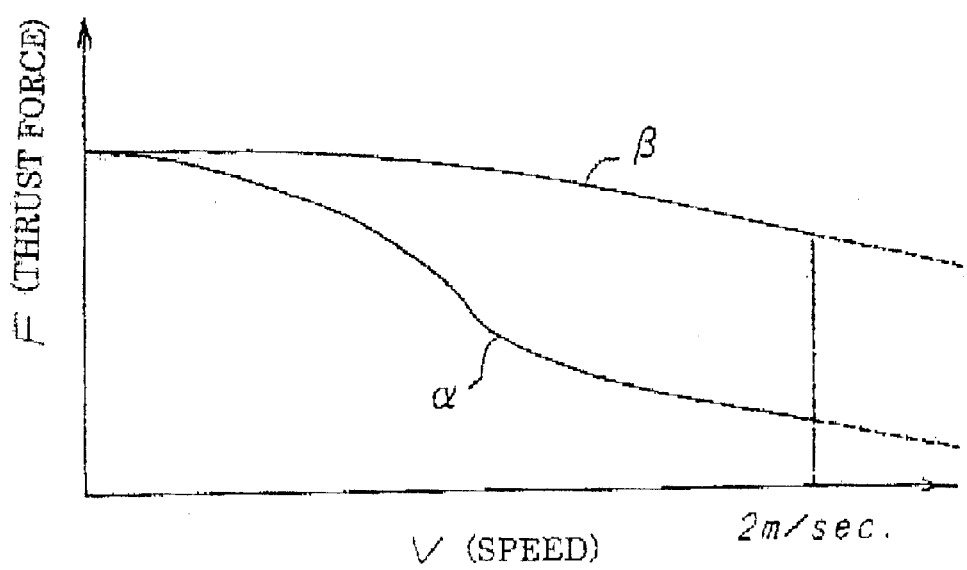
FIG. 16 is a graph of a comparison of the characteristic curves of the dependency of the thrust versus the speed of the movable member in the cases where the platen is a block material and is a stacked member.

In this way, since it is possible to realize an X-axis movable member 60X giving thrust in the normal direction of the joined surfaces of the stacked member, it is possible to realize utilization of a stacked member of magnetic sheets T as the platen 50. As will be understood from the characteristic curve β of the dependency of the thrust force versus speed shown in FIG. 16, even if making the frequency of the drive period current (current pulse) higher and making the speed of advance higher, the thrust force does not fall that much up to the high speed region (2 m/sec). Therefore, it becomes possible to realize a high speed, high thrust, and high efficiency linear motor.

The spatial phase relationship between the X-side pole teeth $KA_x$ and $KA'_x$ ($KB_x$ and $KB'_x$) of each X-axis movable member 60X and the platen dots D arranged in the X-axial direction at the platen 50 side is relative, so instead of giving a staggered arrangement among the pole teeth $KA_x$ and $KA'_x$ ($KB_x$ and $KB'_x$), it is possible to give a staggered arrangement among the platen dots D arranged in the X-axial direction at the platen 50 side. The number of dots on the platen surface, however, is enormous, so this would be disadvantageous in the production of the platen 50. It would be realizable however in the case of a platen of a small area or with the development of high precision techniques for production of platens.

Since a thrust force acts on the pole teeth switching from a thrust branched magnetic flux portion d to a concentrated magnetic flux portion a, the thrust branched magnetic flux portion d and the concentrated magnetic flux portion a occur at the pole teeth of the opposite yokes, so a rotational moment acting on the X-axis movable member 60X occurs in alternately forward and reverse directions and the X-axis movable member 60X moves translationally along with the rotational vibration. The higher the speed of travel, however, the smaller the ratio of the rotational vibration with respect to the speed of travel.

Here, considering the relationship between the dot pitch P of the platen 50 (same as pitch of pole teeth of X-axis movable member 60X) and the magnetic sheets T, the thickness of the magnetic sheets T may be less or more than the dot pitch, but for achieving high speed, high thrust, and high efficiency, it is preferably less than the dot pitch. Taking note of the pole teeth where the extinguished magnetic flux portion b occurs in the magnetic circuit, the pole teeth have no direct relevance to the thrust force or stability of the movable member. They are just so to say assigned in series. Further, the pole teeth where the extinguished magnetic flux portion b occurs differ the most among the pole teeth from the pole teeth where the concentrated magnetic flux portion a occurs. There is a spatial phase difference of half a pitch. Therefore, as in this embodiment, in the case of a platen 50 using magnetic sheets T having a thickness within half of a pitch, the magnetic circuit formed along the sheet edge direction inherently finds it hard to hold magnetic coupling with pole teeth where the extinguished magnetic flux portion occurs, so there is no need to generate an alternating magnetic flux of a strength exactly extinguishing the bias magnetic flux and the degree of freedom of design is increased. This is also an advantage of using a stacked member as a platen. Further, since the platen 50 is a stacked member of magnetic sheets T, it may be a stacked member with plastic or other nonmetallic materials sandwiched between dots in the X-axial direction. Further, it is not necessary to provide recesses between the dots. The platen can also be fabricated easily. Further, the leakage magnetic flux can be reduced and a higher efficiency can be contributed to.

Figure 6:
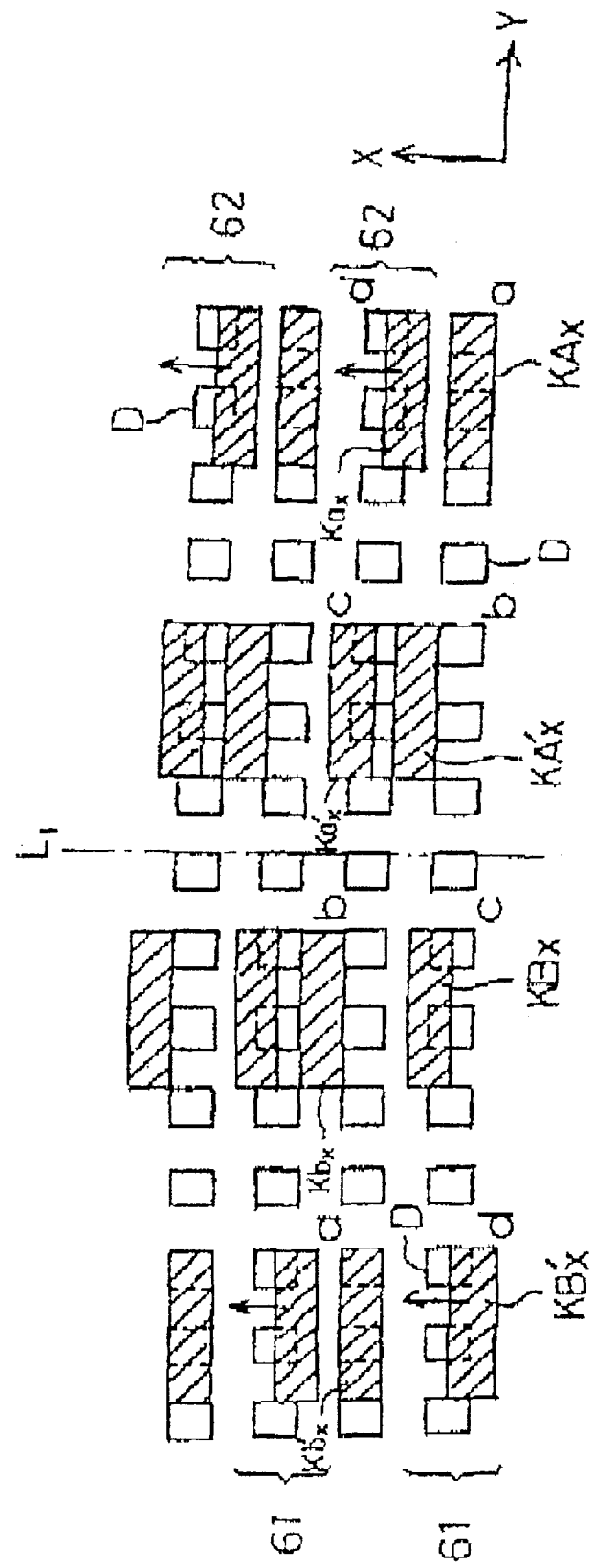
FIG. 6 is a schematic plan view of an X-axis movable member having a group of patterns having both a first pole tooth pattern and second pole tooth pattern.

The group of pole teeth shown in FIG. 3 corresponds to an array of for example the pole tooth pattern 61 among the four types of pole tooth patterns repeated at one-pitch intervals in the X-axial direction. Here, if the pole tooth pattern 61 is made the fist pole tooth pattern, and for example, as shown in FIG. 6, if a second pole tooth pattern 62 relating to the pole teeth $Ka'_x$, $Kb_x$, and $Kb'_x$ is farmed apart from the first pole tooth pattern in the X axial direction, and if the staggered arrangement of the spatial phase relationship held with respect to the closest dots arranged in the X-axial direction of the pole teeth $KA_x$, $KA'_x$, $KB_x$, $KB'_x$ of the first pole tooth pattern and the staggered arrangement are line symmetric with respect to the X-direction line $L_1$ passing through the pattern center, a forward and reverse rotational moment act simultaneously on the X-axis movable member 60X, so the rotational moments are canceled out and the rotational vibration can be eliminated. This is because the pole tooth $KB'_x$ of the first pole tooth pattern and the pole tooth $Ka_x$ of the second pole tooth pattern 62, the pole tooth $KB_x$ of the first pole tooth pattern 61 and the pole tooth $Ka'_x$ of the second pole tooth pattern 62, the pole tooth $KA'_x$ of the first pole tooth pattern and the pole tooth $Kb_x$ of the second pole tooth pattern 62, and the pole tooth $KA_x$ of the that pole tooth pattern 61 and the pole tooth $Kb'_x$ of the second pole tooth pattern 62 have the same spatial phases with respect to the closest dots.

Figure 7:
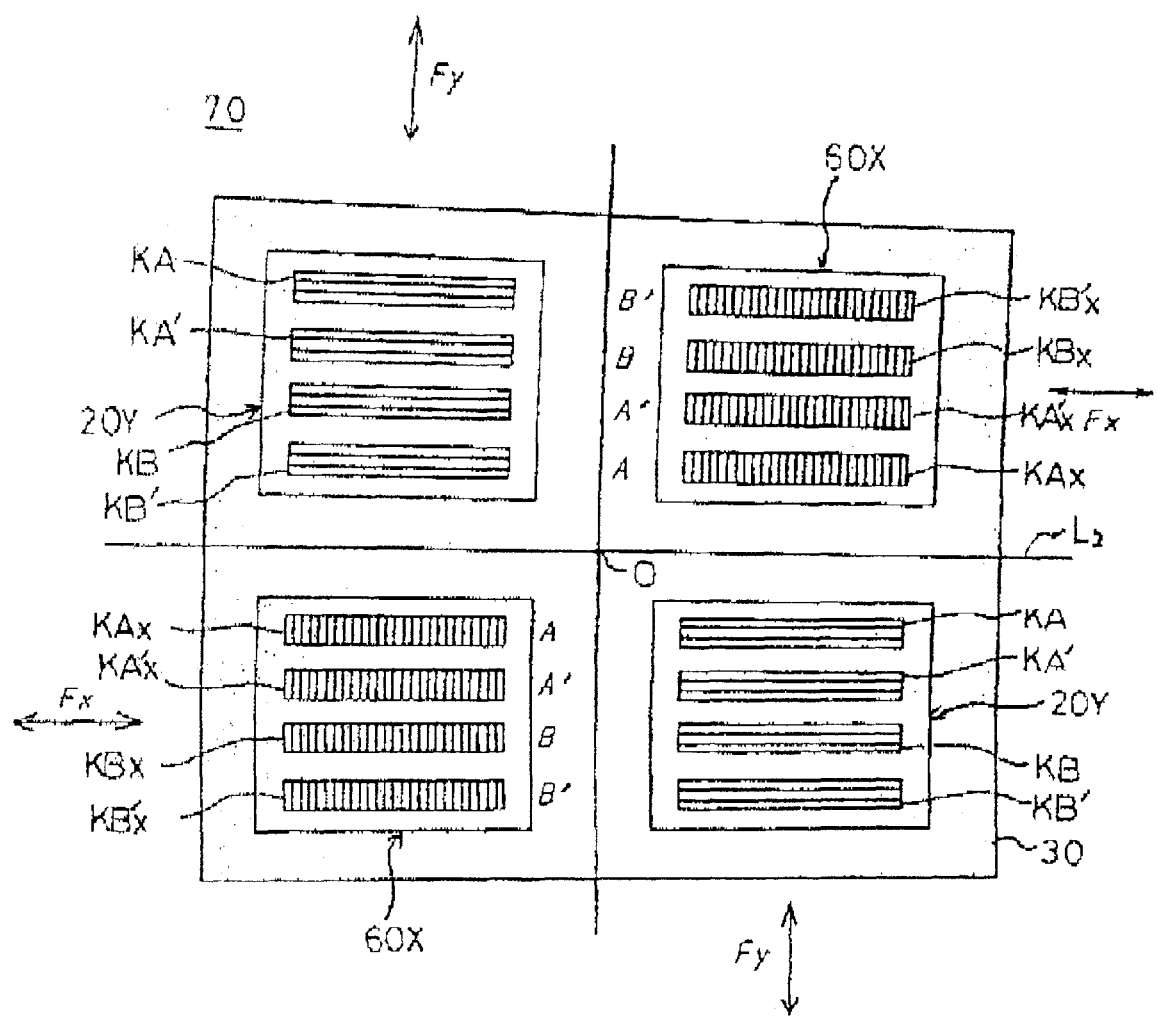
FIG. 7 is a plan view of the relative arrangement of X-axis movable members and Y-axis movable members.

In this embodiment, as explained above, X-axis movable members 60X and Y-axis movable members 20Y are connected in an in-plane perpendicular relationship to form a composite movable member 70. As shown in FIG. 7, the two X-axis movable members 60X and two Y-axis movable members 20Y are arranged diagonally with respect to the center point O of the plane of the composite movable member 70, and the pole tooth patterns 61 of one of the X-axis movable members 60X (branched magnetic path legs A, A', B, B') and the pole tooth patterns 61 of the other of the X-axis movable members 60X (branched magnetic path legs A, A', B, B') are arranged to be line symmetric about the X-direction line $L_2$ passing through the center point O of the plane. The rotational moment about the center point O of the plane of the composite movable member 70 acts simultaneously in the forward and reverse directions, the rotational moments are canceled out, and the rotational vibration of the composite movable member 70 as a whole can be eliminated and therefore stable travel in the X-axial direction and Y-axial direction can be realized from low speed travel to high speed travel.

Second Embodiment

Figure 8:
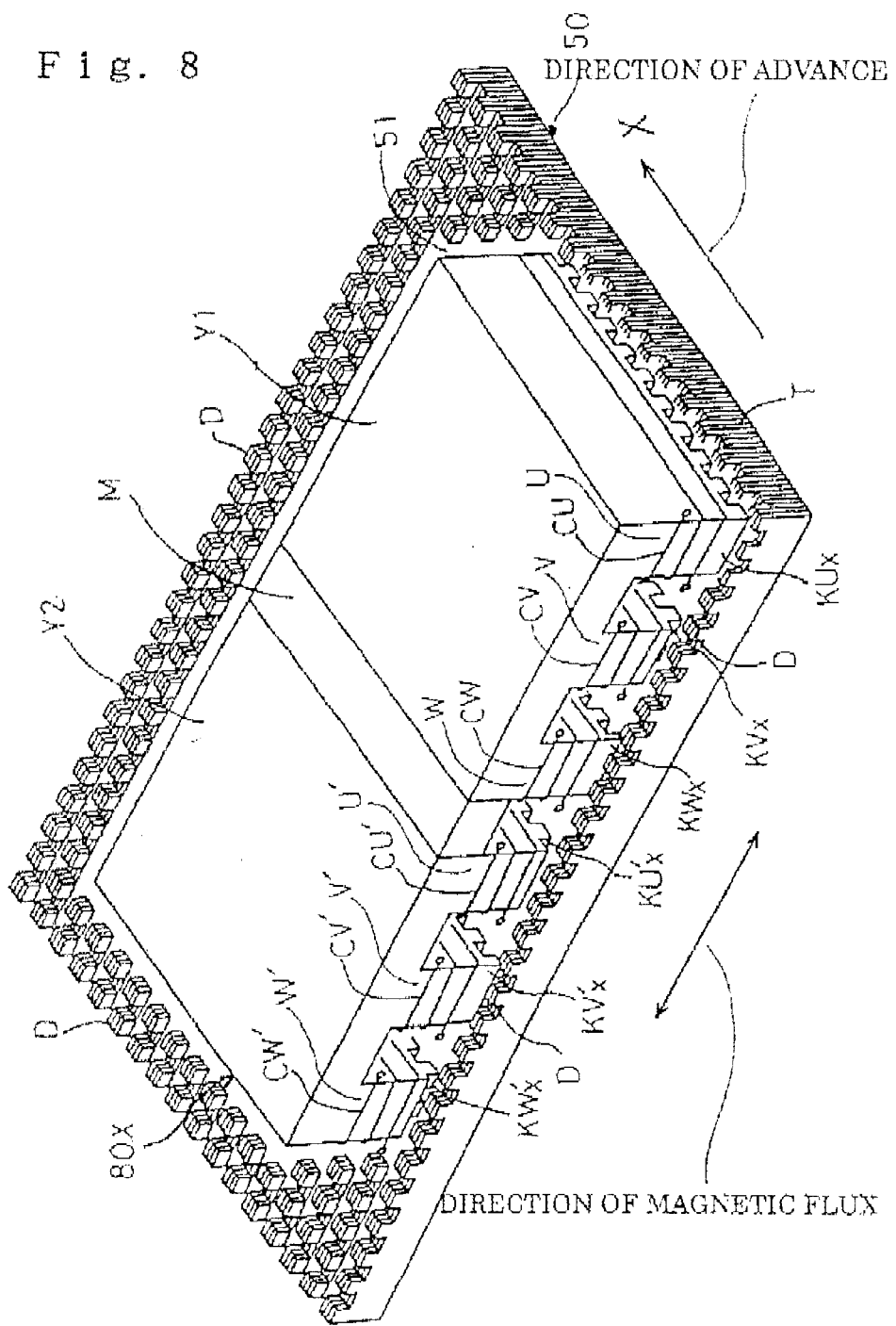
FIG. 8 is a perspective view of the schematic configuration of an X-axis movable member in a 3-phase planar linear motor according to a second embodiment of the present invention.
Figure 9:
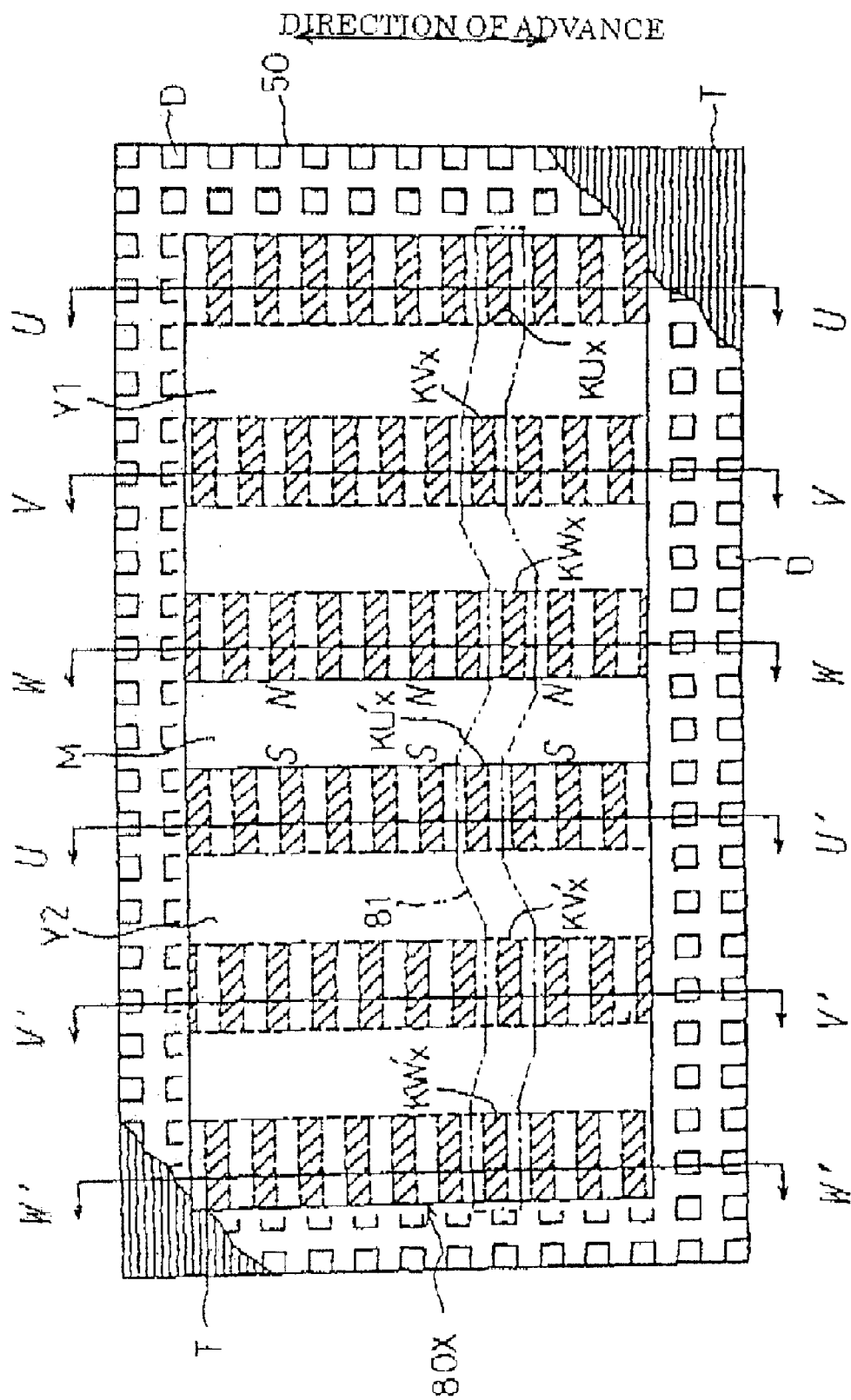
FIG. 9 is a plan view of the relative spatial phase between the pole teeth of the X-axis movable member and platen dots.
Figure 10:
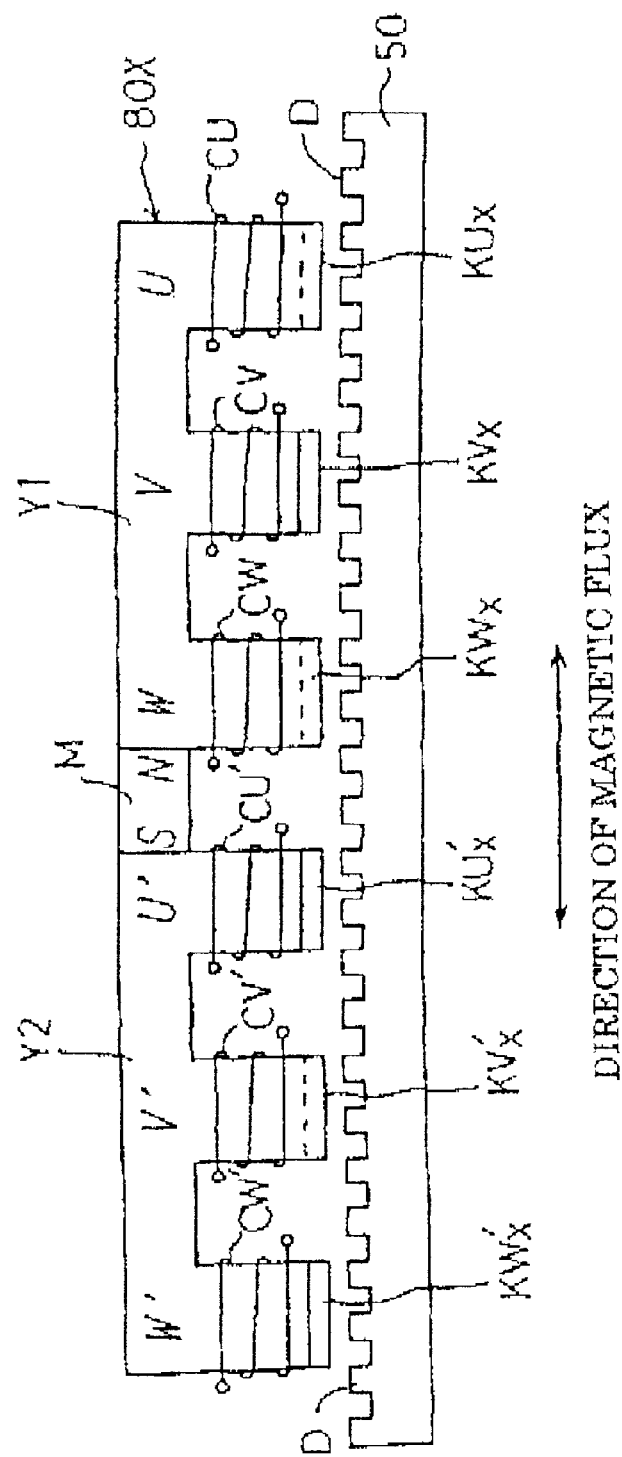
FIG. 10 is a side view of the X-axis movable member seen in the X-axial direction.
Figure 15B:
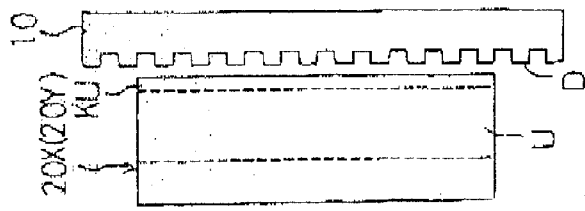
FIG. 15B is a right side view of the some three-phase planar linear motor.
Figure 15A:
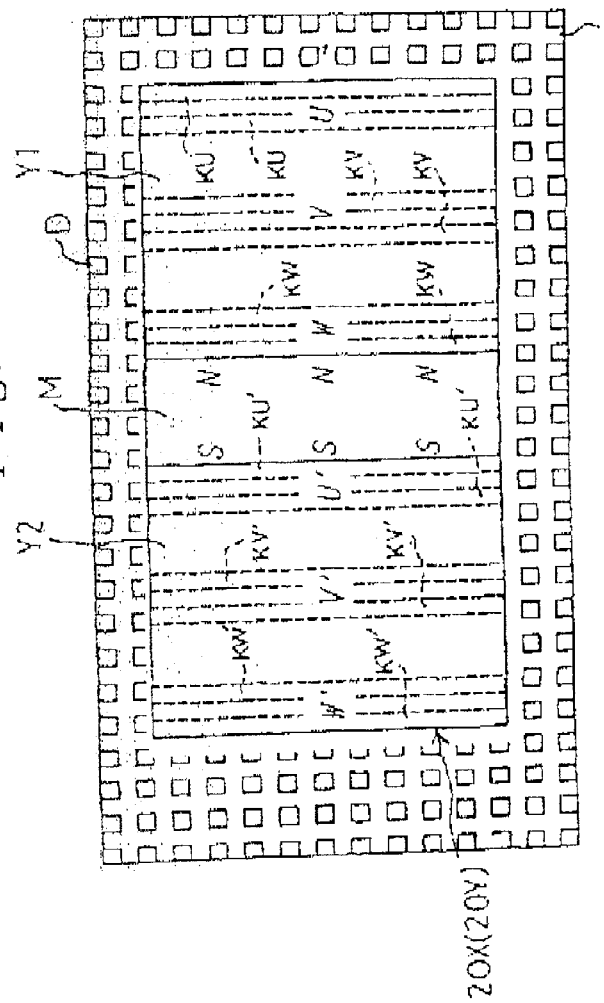
FIG. 15A is a plan view of a conventional three-phase planar linear motor.
Figure 15C:
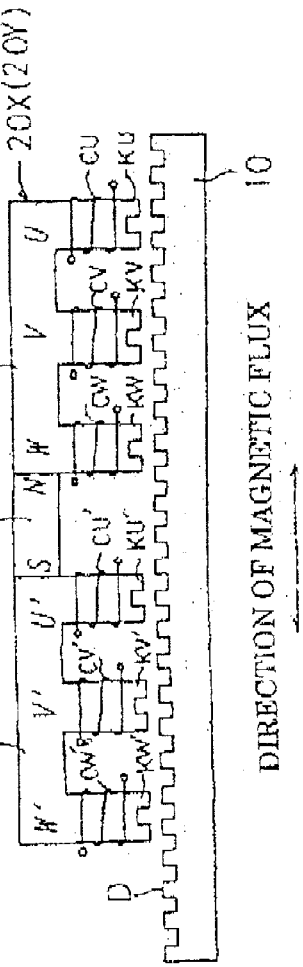
FIG. 15C is a front view of the same three-phase linear motor.

FIG. 8 is a perspective view of the schematic configuration of an X-axis movable member in a three-phase planar linear motor according to a second embodiment of the present invention, FIG. 9 is a plan view of the relative spatial phase between the pole teeth of an X-axis movable member and platen dots, FIG. 10 is a side view of an X-axis movable member seen in the X-axial direction, and FIGS. 11A to 11F are sectional views of the states cut along the line W'—W', line V'—V', line U'—U', line W—W, line V—V, and line U—U in FIG. 9. Note that in FIG. 8 to FIGS. 11A to 11F, portions the same as in FIG. 15 are assigned the same reference numerals and explanations thereof are omitted. Further, portions the same as in the first embodiment will not be alluded to.

Figure 11A:
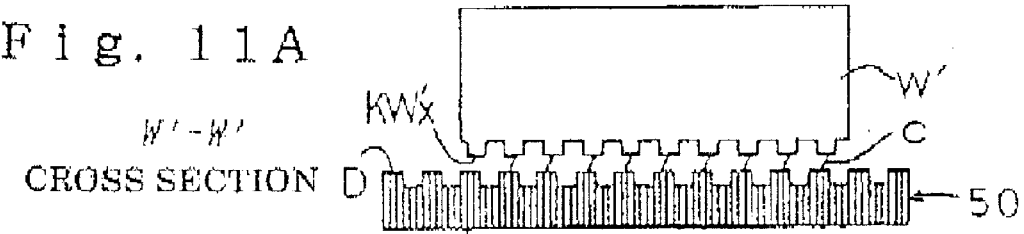
FIGS. 11A to 11F are sectional views of the states cut along the line W'—W', line V'—V', line U'—U', line W—W, line V—V, and line U—U in FIG. 9.
Figure 11B:
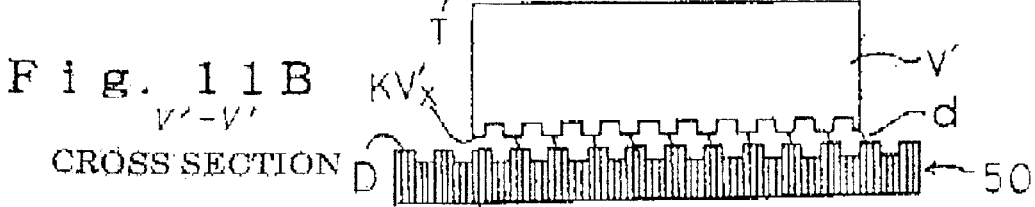
Figure 11C:
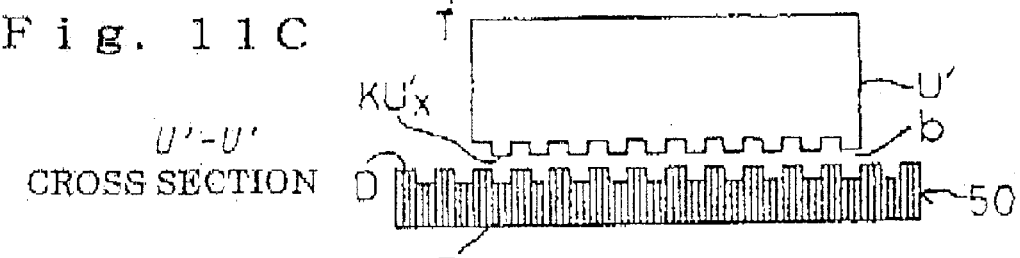
Figure 11D:
Figure 11E:
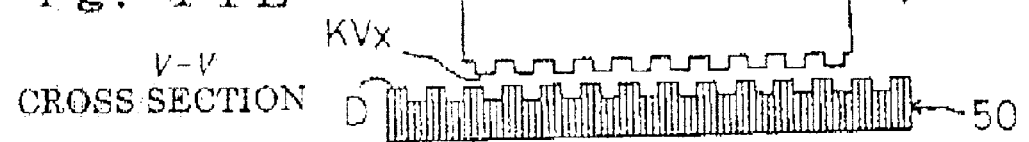
Figure 11F:
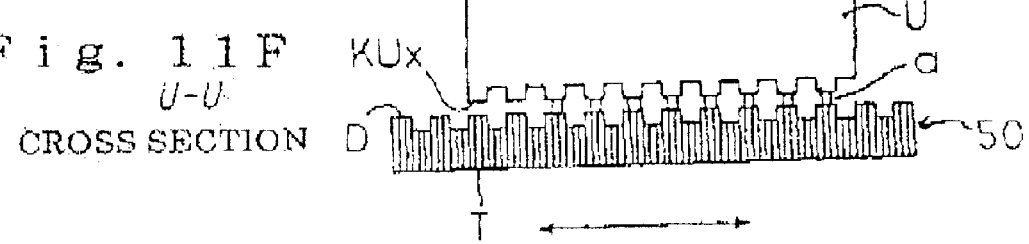

The six pole teeth $KU_x$, $KV_x$, $KW_x$, $KU'_x$, $KV'_x$, and $KW'_x$ of an pole tooth pattern 81 in one pitch in the X-axial direction in an X-axis movable member 80W of the present embodiment are arranged staggered in the one-dot pitch P in the normal direction of the joined surfaces of the magnetic sheets T. Further, they have spatial phases held with respect to the closest dots arranged in the normal direction shifted by increments of the spatial phase difference (P/6). The pole tooth $KU_x$ in the pole tooth pattern 81 surrounded by the two-dot chain line in FIG. 9 is in register with the closest dot D. A concentrated magnetic flux portion a occurs in the air gap shown in FIG. 11F and the pole tooth $KV_x$ is staggered advanced by exactly P/3 with respect to the closest dot D; in FIG. 11E, the air gap becomes the weak branched magnetic flux not shown and the pole tooth $KW_x$ is staggered delayed by exactly P/3 from the closest dot D; and in FIG. 11D, again a weak branched magnetic flux results not shown in the air gap. The pole tooth $KU'_x$ is staggered delayed by exactly half a pitch with respect to the closest dot. As shown in FIG. 11C, the air gap becomes the extinguished magnetic flux portion b and the pole tooth $KV'_x$ is staggered delayed by exactly P/6 from the closest dot D, the air gap shown in FIG. 11B becomes the thrust branched magnetic flux portion d and the pole tooth $KW'_x$ is staggered advanced by exactly P/6 with respect to the closest dot D, and the air gap shown in FIG. 11A becomes a pullback branched magnetic flux portion c. The X-axis movable member 80X has a group of patterns comprised of the pole tooth pattern 81 repeated in the X-axial direction at one-pitch intervals.

In this three-phase planar linear motor, a concentrated magnetic flux portion a and a branched magnetic flux portion cd separately are generated at the yokes Y1 and Y2. This is because the excitation coils of the same phase are wound separately around the yokes Y1 and Y2. The rest of the configuration of the three-phase planar linear motor of this embodiment can use the configuration of the first embodiment.

Even in such a three-phase planar linear motor, in the same way as the first embodiment it is possible to realize an X-axis movable member 80X giving thrust in the normal direction of the joined surfaces of the stacked member, so use of the stacked member of the magnetic sheets T as the platen 50 can be made practical and realization of a high speed, high thrust, and high efficiency planar motor becomes possible.

The pole teeth where the extinguished magnetic flux portion b occurs differ the most, that is, half of a pitch, among the pole teeth from the pole teeth where the concentrated magnetic flux portion a occurs, in the case of a platen using a magnetic sheet having a thickness of within half a pitch, the magnetic circuit formed along the sheet edge direction inherently finds it hard to hold magnetic coupling with pole teeth where the extinguished magnetic flux portion occurs, so there is no need to generate an alternating magnetic flux of a strength exactly extinguishing the bias magnetic flux and the degree of freedom of design is increased. In the case of a three-phase planar linear motor of this embodiment, the spatial phase difference held by an pole tooth of a concentrated magnetic flux and the pole teeth of the pair of branched magnetic fluxes with respect to the closest dots is P/6, while the spatial phase difference of the pole tooth of one branched magnetic flux portion c and the pole tooth of another branched magnetic flux portion d with respect to the closest dots is P/3. Therefore, in the case of a three-phase linear motor, it is preferable to use a magnetic sheet with a thickness of not more than ⅓ of the pitch. Magnetic coupling with the extinguished magnetic flux part b is hard to occur due to the joined surfaces, the invalid magnetic flux can be reduced, and simultaneously magnetic coupling is hard to occur at both of the pair of pole teeth ($KV_x$ and $KW_x$ in FIG. 11) where the thin branched magnetic fluxes occur, so the magnetic coupling consumed in stopping the progression is cut off and can be put to use in the thrust force of the progression.

Note that it is of course also possible to realize a four-phase or higher linear motor.

INDUSTRIAL APPLICABILITY

As explained above, the linear motor according to the present invention has a monoaxial movable member giving thrust in a normal direction of the joined surfaces of the stacked member, so use of the stacked member of the magnetic sheets as the platen can be made practical and a high speed, high thrust, and high efficiency motor can be provided, so is suitable for use not only in a device mounting system, but also an IC test handler or other various types of equipment or machinery.

What is claimed is:

1. A linear motor provided with a platen having a platen surface formed with a plurality of platen dots arranged in a matrix and an X-axis movable element having an pole tooth pattern having a set of at least 2n (where n is an integer of 2 or more) pole teeth for generating an advancing magnetic flux with the closest dots among the platen dots, said linear motor characterized in that the platen has the parallel sheet edge surfaces of the stacked member comprised of a plurality of magnetic sheets stacked together as the platen surface, the 2n number of magnetic teeth of the pole tooth pattern are arranged laterally in a relation having an equal spatial phase relation held with the closest dots arranged in the sheet edge direction of the magnetic sheets, the 2n number of pole teeth of the pole tooth pattern are arranged staggered within one dot pitch (P) in the normal direction of the joined surfaces of the magnetic sheets, and the spatial phase held with respect to the closest dot arranged in the normal direction is shifted by increments of the spatial phase difference (P/2n).

2. A linear motor as set forth in claim 1, characterized in that the X-axis movable member has a group of patterns comprised of the pole tooth pattern arranged repeatedly in the normal direction.

3. A linear motor as set forth in claim 1, characterized in that said X-axis movable member has said pole tooth pattern as a first pole tooth pattern, and a second pole tooth pattern formed apart from the first pole tooth pattern in the normal direction, the staggered arrangement of the first pole tooth pattern and the staggered arrangement of the second pole tooth pattern in spatial phase relationship held with respect to the closest dots arranged in the normal direction of the joined surfaces of the magnetic sheet being line symmetric with respect to the X-direction line passing through the pattern.

4. A linear motor as set forth in any one of claims 1 to 3, characterized by having a composite movable member comprised of said X-axis movable member and a Y-axis movable member moving in the sheet edge direction of the magnetic sheets connected in an in-plane perpendicular relationship.

5. A linear motor as set forth in claim 4, characterized in that two of said X-axis movable members and two of said Y-axis movable members are arranged diagonally with respect to a center point in the plane of the composite movable member and in that the pole tooth patterns of one of the X-axis movable members and the pole tooth patterns of the other of the X-axis movable members are line symmetric with respect to an X-direction line passing through the center point in the plane.

6. A linear motor as set forth in any one of claims 1 to 3, characterized in that the thickness of the magnetic sheets is a thickness of not more than half the pitch of the platen dots.

7. A linear motor as set forth in claim 6, characterized in that the thickness of said magnetic sheets is a thickness of not more than 1/n the pitch of the platen dots.

* * * * *